(12) United States Patent
Highsmith (10) Patent No.: US 6,957,668 B1
(45) Date of Patent: Oct. 25, 2005

(54) WASTE WATER DISPOSAL SYSTEM (76) Inventor: Roderick Highsmith, 4137 Bull Run Mountain Rd., The Plains, VA (US) 20198

( * ) Notice: Subject to any disclaimer, the term of this patent is extended or adjusted under 35 U.S.C. 154(b) by 0 days.

(21) Appl. No.: 10/374,749

(22) Filed: Feb. 25, 2003

Related U.S. Application Data (63) Continuation of application No. 09/637,365, filed on Aug. 15, 2000, now Pat. No. 6,543,484.

(51) Int. Cl.$^7$ .......................................... A01G 25/09
(52) U.S. Cl. .................. 137/899; 137/240; 137/255; 137/355.12; 137/355.2; 242/388.9; 242/392
(58) Field of Search ................ 137/899, 240, 137/255, 355.12, 355.2; 242/388.9, 392

(56) References Cited

U.S. PATENT DOCUMENTS

| | | | |
|---|---|---|---|
| 517,731 A | 4/1894 | Casson | |
| 538,950 A | * 5/1895 | Casson | ................. 137/355.28 |
| 1,573,439 A | 2/1926 | Bedford | |
| 3,712,331 A | 1/1973 | Otto | |
| 3,811,462 A | * 5/1974 | Feliz | ........................ 137/240 |
| 3,981,323 A | 9/1976 | Watson | |
| 4,223,702 A | 9/1980 | Cook | |
| 4,312,147 A | 1/1982 | Christiansen | |
| 4,513,772 A | 4/1985 | Fisher | |
| 4,838,302 A | 6/1989 | Prange | |
| 4,854,349 A | 8/1989 | Foreman | |
| 4,993,449 A | 2/1991 | Stutzman et al. | |
| 5,023,959 A | * 6/1991 | Mercer | ........................ 4/321 |
| 5,141,017 A | * 8/1992 | Trottier | ..................... 137/240 |
| 5,560,390 A | 10/1996 | Royds | |
| 5,653,262 A | 8/1997 | Hanemaayer | |
| 5,740,582 A | * 4/1998 | Harrelson, II | ................ 15/315 |
| 5,904,183 A | 5/1999 | Leech | |
| 5,947,156 A | 9/1999 | Tomczyk | |

* cited by examiner

Primary Examiner—A. Michael Chambers
(74) Attorney, Agent, or Firm—Knobbe Martens Olson & Bear, LLP (57) ABSTRACT

A waste water disposal system includes a carousel that is driven to extend and retract a hose that is connected on one end to a dumping station and at a second end to pipes connecting to the black and gray water tanks of an RV.

8 Claims, 12 Drawing Sheets

WASTE WATER DISPOSAL SYSTEM

RELATED APPLICATIONS

This application is a continuation of U.S. application Ser. No. 09/637,365, filed Aug. 15, 2000, now U.S. Pat. No. 6,543,484, which is hereby incorporated herein in its entirety.

BACKGROUND OF THE INVENTION

The present invention relates generally to an extendable waste hose system for dumping waste from a recreational vehicle (RV).

Present recreational vehicles that have a water system and toilet built into them have a significant drawback in that disposal of waste water must be done manually by the RV user. This task often results in the spillage of raw sewage and resulting in odor that is both unpleasant and unsanitary. With all the modern conveniences of the present day RV's this messy task is still performed archaically. In accordance with the prior art, dumping of waste water from an RV was accomplished by means of a loose hose that had to be connected on both ends, one end to the vehicle and the other to the dump stations in an RV park or at a roadside dumping station. One would have to put on rubber gloves as a barrier from the accidental spills and leaks. Afterwards, the clean up of the loose hose and fittings would be accomplished by a great deal of handling with a water hose.

An example of a system for disposing of waste from RV is shown in U.S. Pat. No. 5,653,262 issued to Hannemaayer, which discloses a sewer discharge and stowing system including an axially extendable flexible hose. U.S. Pat. No. 5,904,183 issued to Leech discloses a recreational vehicle waste drainer including a drainer sheath and an angled drain nipple connected to an expandable tube 5. U.S. Pat. No. 5,947,156 issued to Tomczyk discloses a holding tank having a waster evacuation device including a telescoping arm and a flexible coupling mount.

A need therefore exists for a waste water disposal system that minimizes the manual intervention required by the RV user. Similarly, a need exists to retrofit RVs and other vehicles containing water and/or toilet systems with waste water disposal systems that minimize the need for manual intervention. It would be desirable for such a waste water disposal system to.

SUMMARY OF THE INVENTION

The present invention meets this need by providing a waste water disposal system that eliminates the need to handle or come near waste while dumping and flushing the tanks of an RV. By using the apparatus and methods of the present invention, the manual intervention of prior art waste water disposal systems is minimized or eliminated. Also, in accordance with the present invention, current RV's and vehicles can be retrofitted to include the waste water disposal system of the present invention. In this way such vehicles can attain the benefits of minimizing or eliminating contact with waste water.

With the systems and methods of the present invention, prior art methods of dumping waste will be updated to an easy operation and eliminate all of the unpleasant aspects of dumping waste from an RV. The present invention includes a manually or motor driven carousel covered by a corrugated ribbed surface, which interlocks with the corrugated surface of the discharging hose. This causes the hose to extend and retract as the carousel is rotated in one direction or the other. This system may actuated by a hand held switch that is plugged into the unit; or a switch directly located on the unit casing which causes the motor to rotate in the desired direction. Alternatively, the system may be manually driven.

The system includes fresh water globe valves, check valves and manually operated slide gate valves connected to the main gray water and black water piping. With these devices, the system can be flushed prior to disconnection of the hose from the dumping station. This will eliminate the need for any further cleaning.

To facilitate with the retro fitting of older model recreational vehicles the present invention also contemplates an elevation and lowering device which lowers the whole incased unit closer to the ground to aid in the gravitational flow of waste.

Other advantages and purpose of this invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the present invention provides methods and apparatus for

BRIEF DESCRIPTION OF DRAWINGS

The accompanying drawings, which are incorporated in and constitute a part of this specification, illustrate embodiments of the invention, and, together with the description, serve to explain the principles of the present invention.

DESCRIPTION OF THE PREFERRED EMBODIMENT

Figure 1:
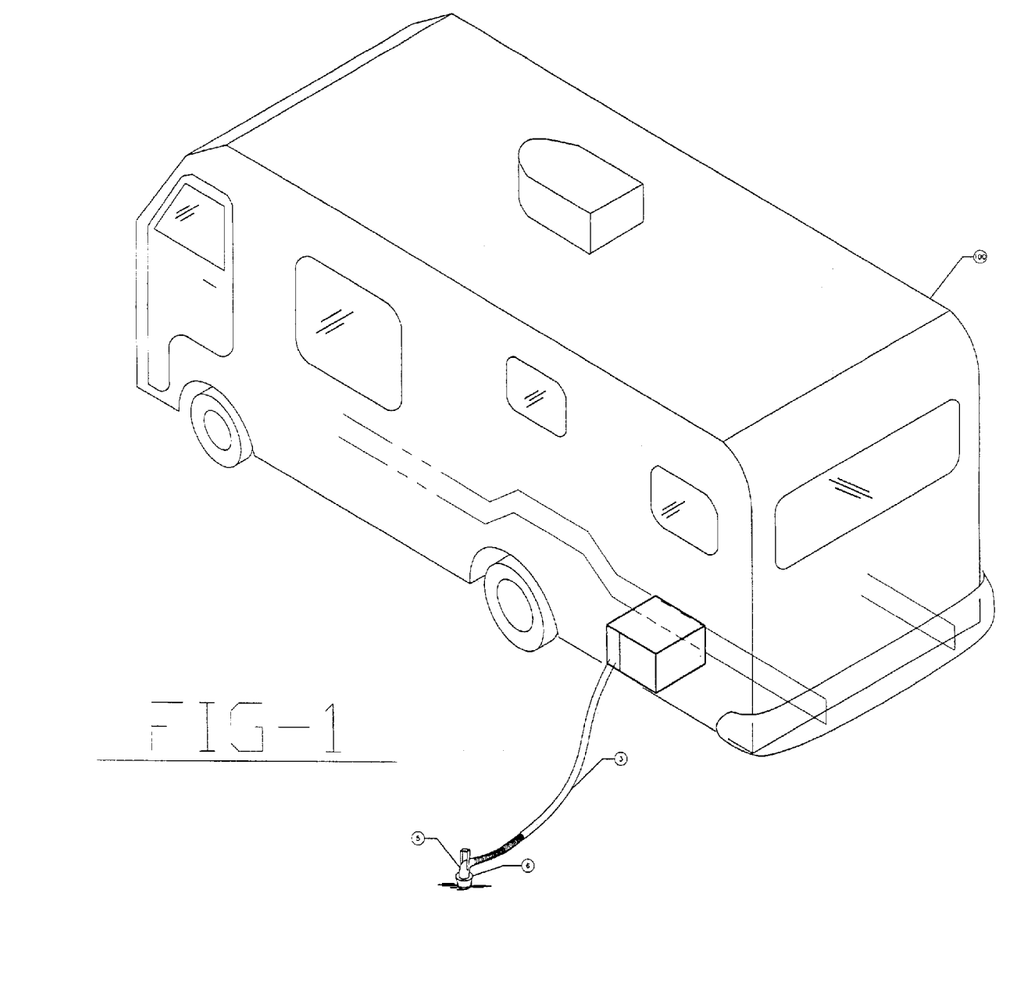
FIG. 1 is a isometrical, diagrammatic view of the system in use, connected between an RV and a waste dump inlet.

FIG. 1 shows a recreational vehicle (RV) 100 in its parked position. A hose 3 extends from RV 100 and is connected internally to the waste water disposal unit of the present invention, which is encased in unitary housing case 25. Hose 3 is preferable a flexible teflon lined hose having a diameter of approximately 3 inches, although any appropriate hose can be used. Hose 3 is also connected to the waste water holding tanks inside RV 100, not shown. The other end of hose 3 is connected to a 90 degree elbow 5, which terminates in a universal-sized dumping connector 6. Terminal connector 6 is preferably a 2¼" to 4¾" rubber cone suited to fit all sizes of dumping stations. The elbow 5 is connected to a handle 4 for easy handling of the hose 3. It is also contemplated that waste water disposal unit including hose 3 can be fitted with a no sag device that slides in and out of the unit simultaneously with the hose. This would prevent sag of the hose and fascilitate dumping.

In accordance with the present invention, the waster water disposal unit of the present invention includes a carousel on which hose 3 is wound. FIGS. 2–6 show details of this feature of the present invention. In particular, FIG. 6 shows a conical-shaped hose carousel 22 overlaid by corrugated rubber matting 20. The rubber matting 20 preferably has a smooth back-side surface and is preferably approximately ¼ inch thick, although different thicknesses can be used in accordance with the present invention. The rubber matting 20 is shown in FIG. 6 to be interlocked together by dove-tailing 21, which connects the mating edges of rubber matting 22, although different ways of interconnecting the ends of rubber matting 22 are contemplated by the present invention. The rubber matting 22 engages into hose 3, which is shown to have a corrugated configuration as well.

As shown, the carousel 22 is conical-shaped. It is contemplated that in accordance with the present invention that carousel 22 can be any shape that fascilitates winding of hose 3. For example, carousel could be circular or could include stepped grooves or edges. Carousel 22 should engage hose 3 and fascilitate the winding of hose 3. The particular shape of carousel 22 is not important to the present invention.

Figure 4:
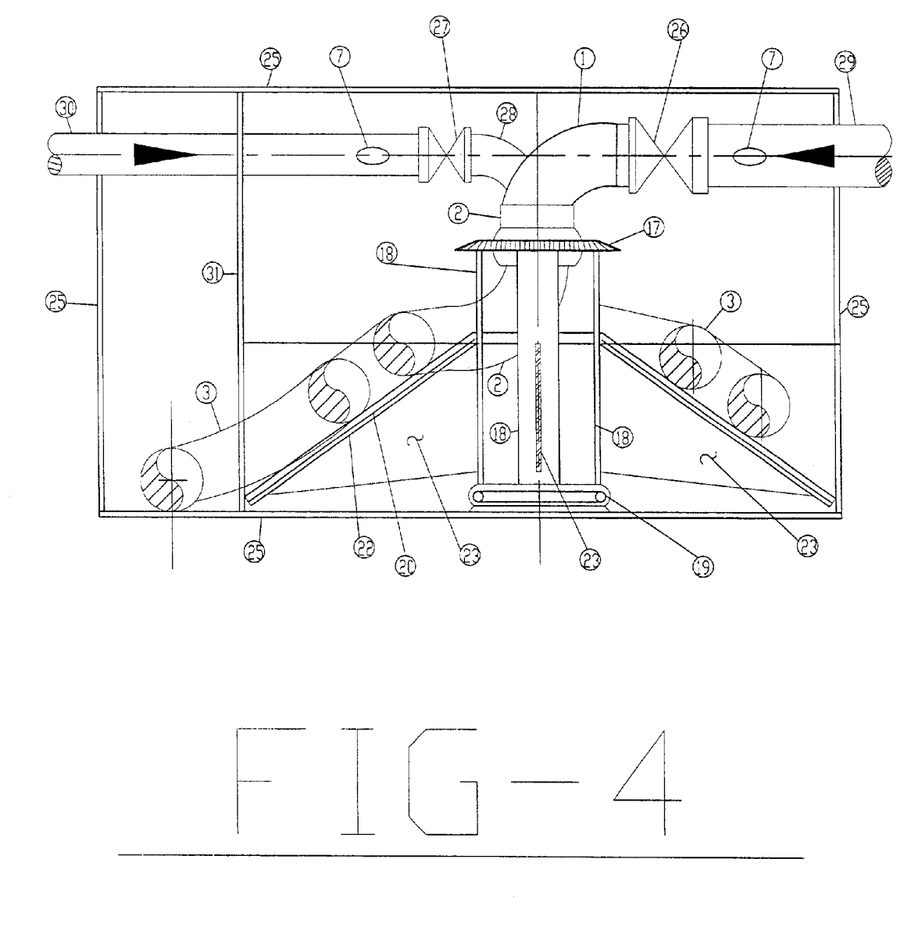
FIG. 4 is a sectional view taken along line "A—A" in FIG. 2 showing how the cone is constructed and the ball bearing base it sits upon.

As shown in FIG. 4, vertical support for the conical-shaped carousel 22 is preferably accomplished by four pieces of structural material 23 connected, such as by welding, to flatbar 18 shown in FIG. 4. In accordance with the present invention, it is contemplated that vertical support fo the conical-shaped carousel 22 can be provided by other structure as well. For example, carousel can be a solid or a honeycomb piece or can be supported by a number of substantially horizontal strut members.

Figure 2:
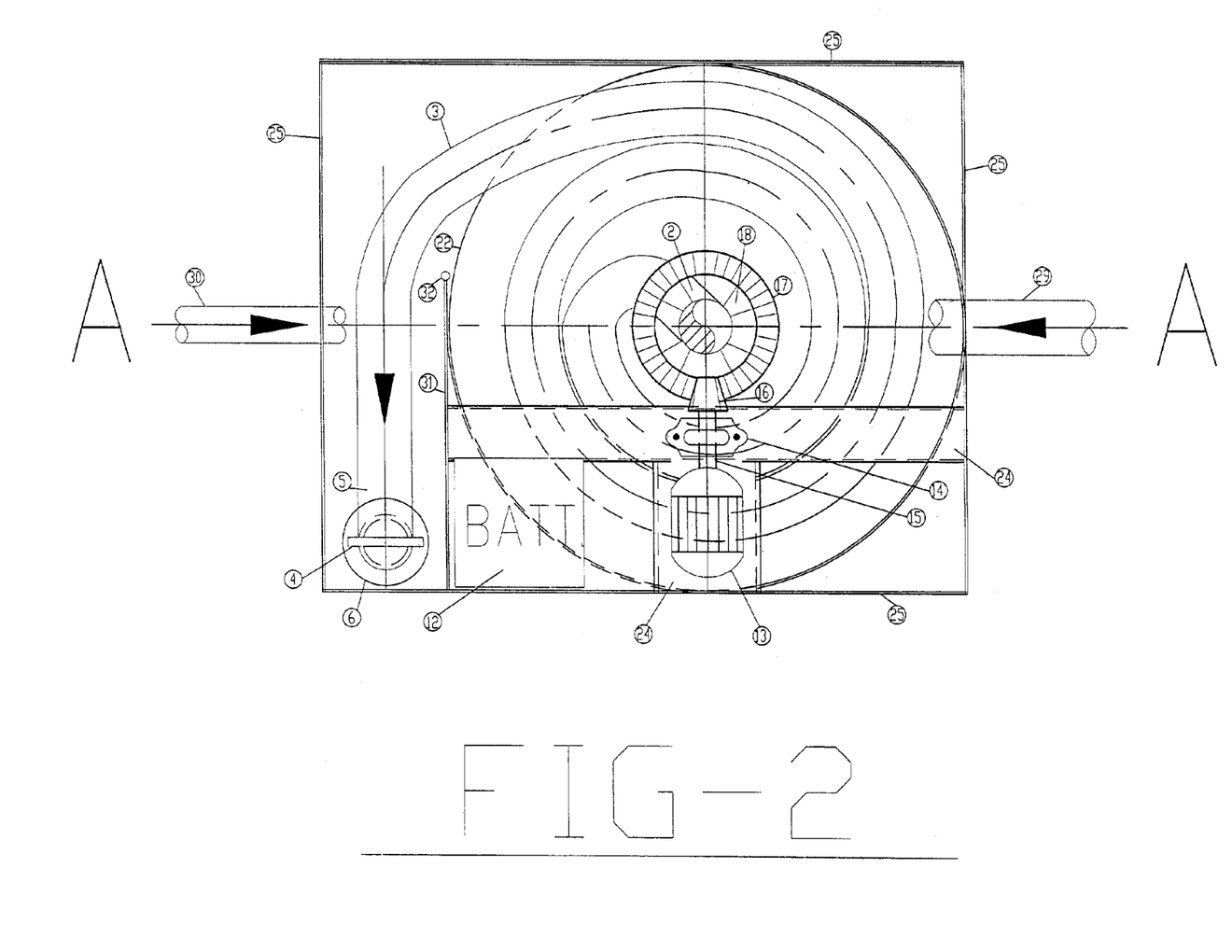
FIG. 2 is a top view looking down inside the encasement showing details of the waste water disposal unit of the present invention.
Figure 3:
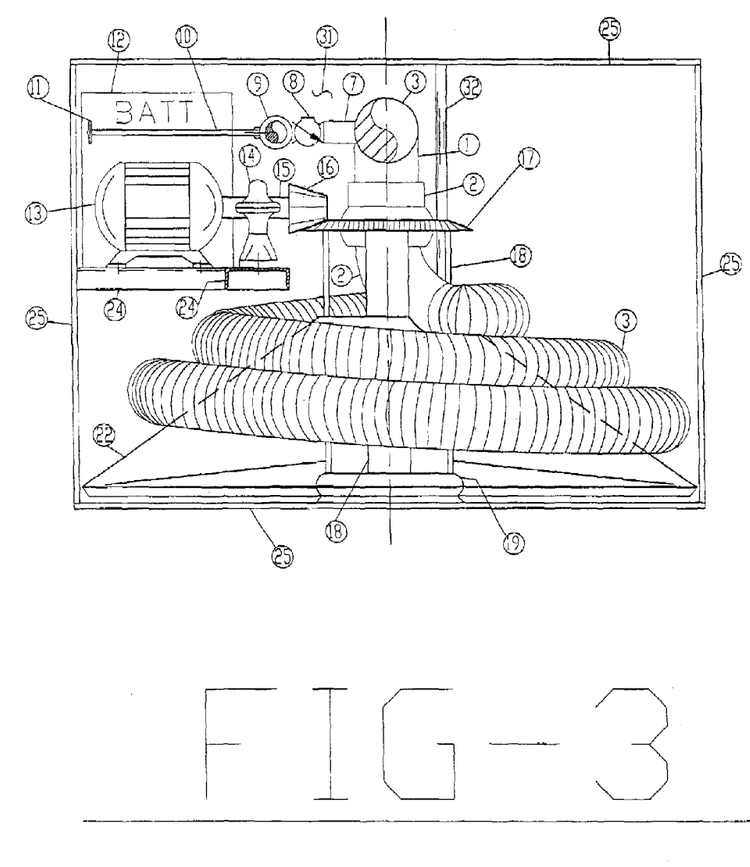
FIG. 3 is a right side elevation view with the casing omitted to expose details of the motor driven conical-shaped carousel.

As shown in FIGS. 2 and 3, the conical-shaped carousel 22 is driven by a reversible electric motor 13 and sitting atop and bolted down to a c-shaped channel structure 24. Electric motor 13 is preferably powered by a 12-volt battery 12, which can be recharged by the main and auxiliary power systems, not shown, of RV 100. Electric motor 13 is connected to a shaft 15, which is held in place by a pillow bearing 14. The pillow bearing 14 preferably sits atop and is bolted down to the c-shaped channel structure 24. At the end of the shaft 15 is a star or pinion-type gear 16. The pinion 16 gear interlocks into the ring gear 17, as shown in FIG. 2 and FIG. 3. The ring gear 17 is preferably permanently attached to a single swing joint 2 by a flatbar structure support 18. As shown in FIGS. 3 and 4, the flatbar 18 extends down vertically and connects to the top of a ball bearing base mount 19, which in turn is permanently attached to the bottom of the encasement 25.

Figure 5:
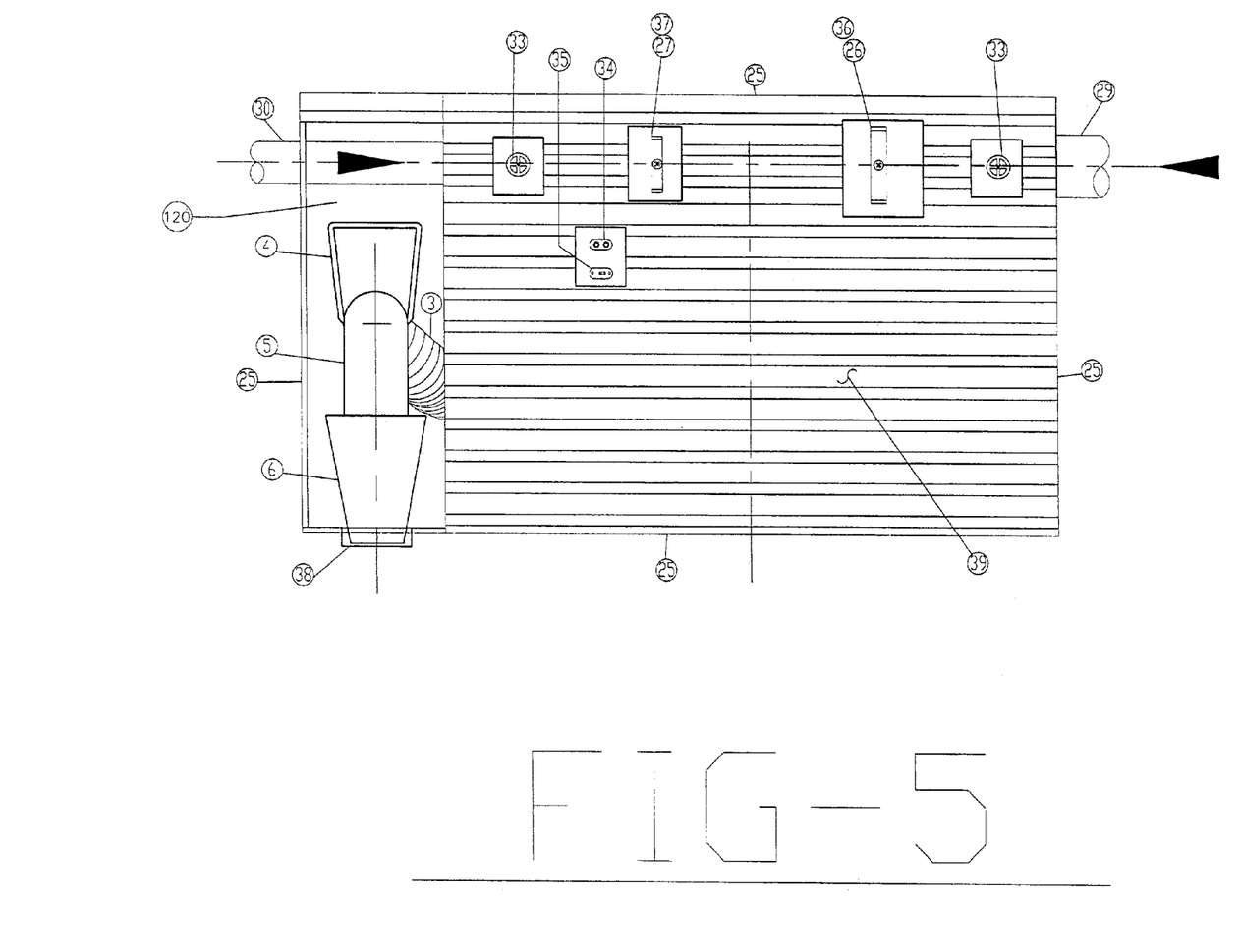
FIG. 5 is a front elevation showing the location of the controls for the waste water disposal unit.
Figure 6:
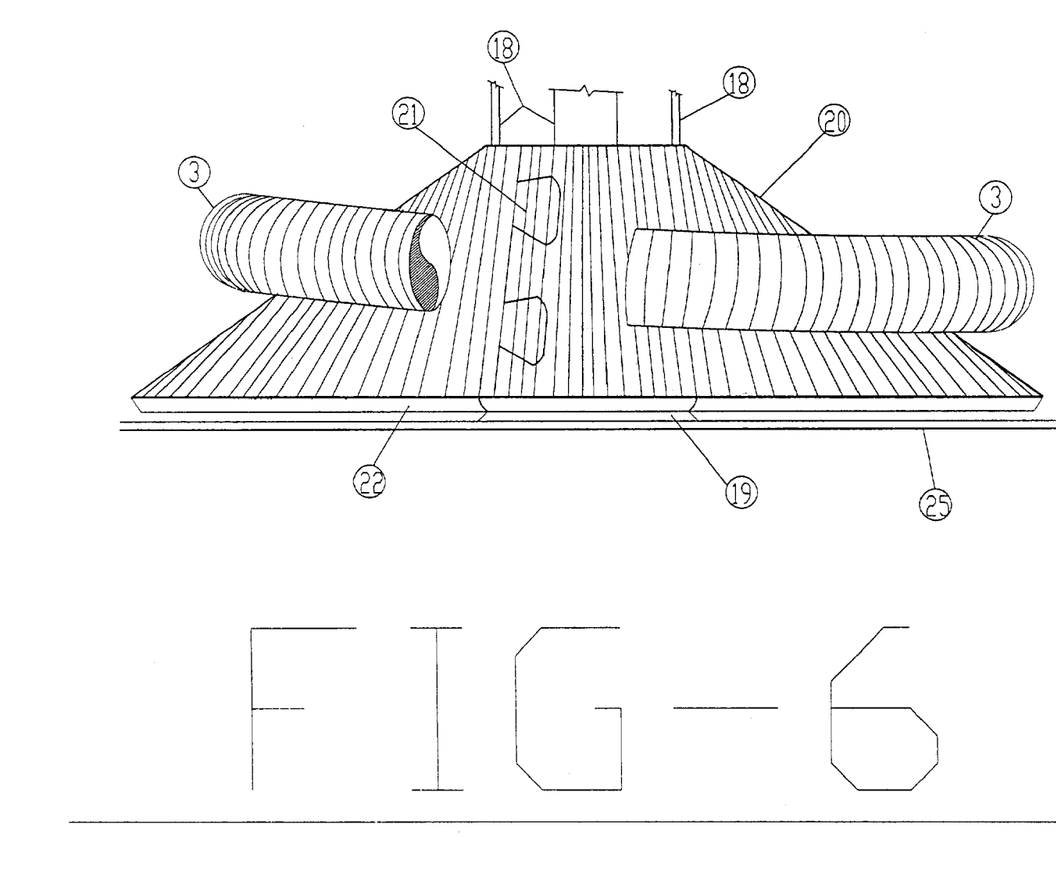
FIG. 6 is an exposed view of the ribbed rubber coverings of the cone shaped carousel and how the hose connects into it with its corrugated surface.
Figure 7:
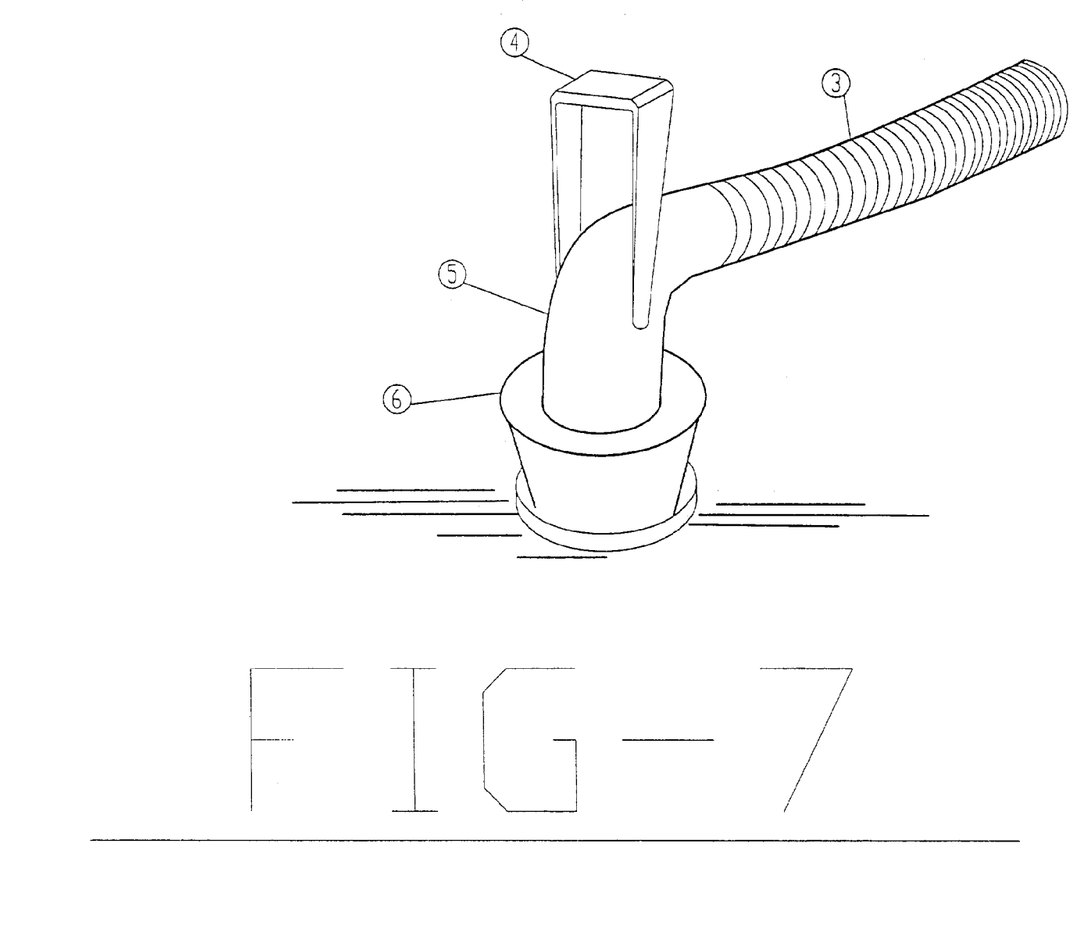
FIG. 7 shows a universal-sized dumping connector seated in a dumping inlet station.

When electric motor is engaged by exterior toggle devices 35, remote switch 34, and 40, shown in FIG. 5, the carousel 22 rotates counter-clockwise to extend hose 3 or clockwise to retract the hose 3. As hose 3 is extended or retracted, it is wound around conical-shaped carousel 22, as shown, for example, in FIGS. 3 and 6. It is noted that in accordance with the present invention hose 3 can be manually extended and retracted by, for example, a crank or other suitable mechanism. As shown in FIGS. 3 and 6, by using the conical-shaped carousel 22, hose 3 is neatly wrapped and piled on itself for compact storage within encasement 25.

As shown in FIG. 4, the waste water disposal unit of the present invention also includes slide gate valves 26 and 27. Slide gate valve 26 is for the black water tank of RV 100, while slide gate valve 27 is for the grey water tank of RV 100. Slide date valve 26 is preferably a 3 inch valve, although other sizes may be used as appropriate. Slide gate valve 27 is preferably a 2 inch valve though, again, other sizes can be used as appropriate. Slide gate valve 26 is connected between a 90 degree inlet tube 1, which connects to the swing joint 2. On the other side, slide gate valve 26 is connected to pipe 29, which is connected to the black water holding tank. Pipe 29 matches the diameter of slide gate valve 26. Slide gate 27 is connected between inlet 28 and pipe 30. Inlet 28 is coupled to 90 degree inlet tube 1, which is connected through swing joint 2 to hose 3. Pipe 30 is connected to the grey water holding tank and has a diameter that matches slide gate valve 27.

As shown in FIGS. 3 and 4, pipes 29 and 30 include flush water inlets 7. The flush water inlets are in turn connected to a check valve 8, which is used as a backflow prevention device meeting ANSI and ASSE requirements. Check valve 8 is preferably coupled to globe valve 9, which is attached to an extended stem 10 and handle 11, which extends to the exterior of encasement 25.

FIG. 5 shows an exterior panel 39 of encasement 25. The exterior panel 39 is preferably aesthetically designed to match the exterior of RV 100 and includes recessed locations that match the manual and electrical controls of the unit. These include slide gate handles 36 and 37 that respectively correspond to the slide gate valves 26 and 27. Also shown in FIG. 5 are flushing valve handles 33, corresponding to globe valve handle 11. Exterior panel 39 also includes a plug-in electrically wired remote switch 34, which connects to a control (not shown) for dump location controlling. Exterior panel 39 also includes toggle switch control 35 for extending and retracting hose 3. Finally, the exterior panel 39 includes a recessed portion 120 that holds the handle 4, 90 degree elbow 5 and universal-sized dumping connector 6. Recess 120 can be covered with a sliding door or other covering mechanism as appropriate.

Operation of the waste water disposal unit of the present invention will now be discussed. Once the hose 3 has been extended and the dumping connector 6 is firmly in position, then the procedure for dumping is to open the slide gate valve 26, which services the black water tank. Once the black water tank is emptied, slide gate valve 26 is closed and slide gate valve 27, which services that grey water tank, is opened. Once the grey water tank is emptied, slide gate valve 27 is closed and slide gate valve is preferably re-opened and flushed by opening valve 9 using handle 33. This will cause clean water to rush in. Back flushing protection is performed by check valve 8, as shown in FIGS. 3 and 5. After suitable amounts of water have flushed through the lines, valve 9 is closed as is slide gate valve 26. The same procedure is followed for slide gate valve 27.

After this flushing is performed, hose 3 will be clean and will be ready to be retracted. Retraction is performed by appropriate maneuvering of toggle switch 35, which will cause motor 13 to rotate pinion gear 16 and ring gear 17, which in turn causes conical carousel 22 to rotate and grip hose 3. Upon retraction, handle 4, 90 degree elbow 5 and dumping connector 6 are situated in recess 120. The end of the dumping connector 6 can be placed into a recessed circular cup holder 38. The area of recess 120 is preferably separated from the area of conical-shaped carousel 22 by a partition 31, as shown in FIGS. 2, 3 and 4, which is preferably capped by a slotted pipe 32.

It is anticipated that owners of existing RV's may want to retrofit their vehicles with the waste water disposal system of the present invention. To deal with the problem of an RV owner desiring a waste water disposal system for his present RV, there is disclosed in accordance with the present invention a retrofit system and method of installation of a retrofit unit.

Figure 8:
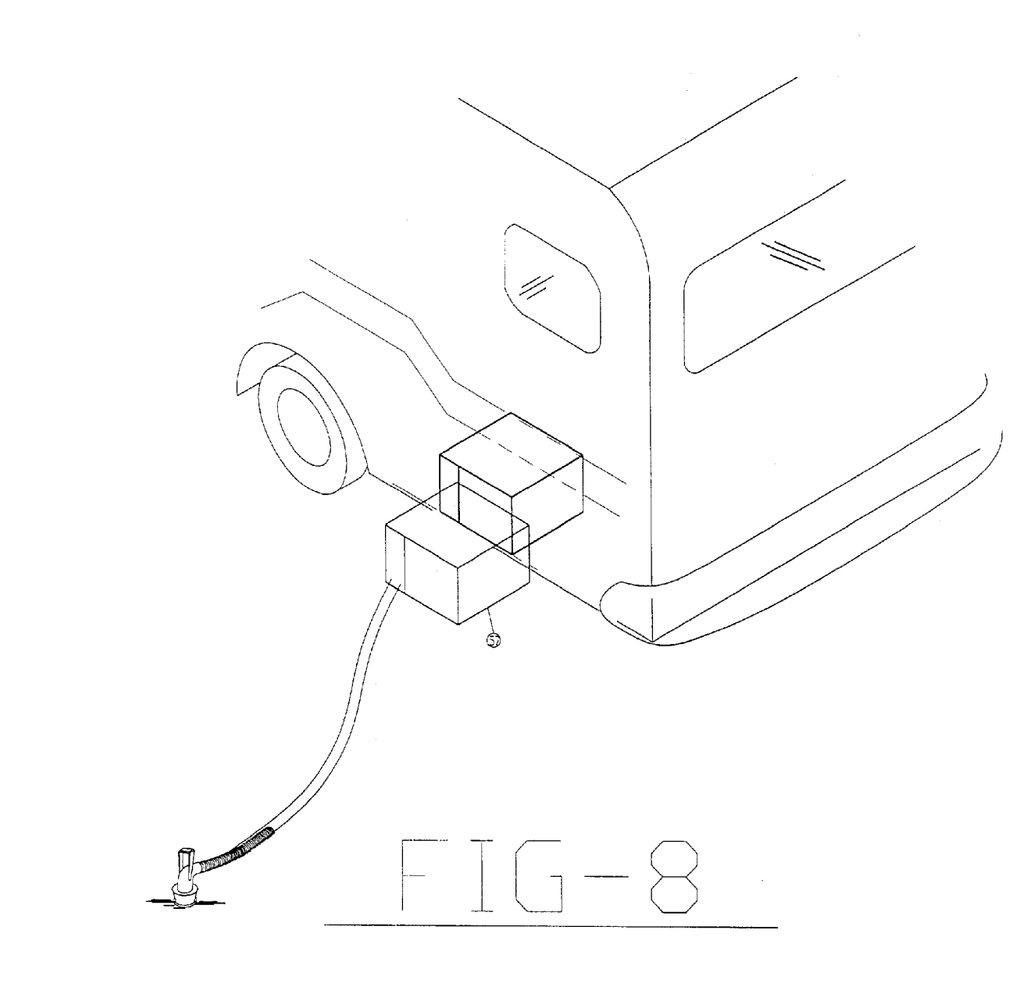
FIG. 8 is an isometrical diagrammatic view of a retrofit unit connected between an RV and a waste dump inlet in accordance with the present invention.
Figure 9:
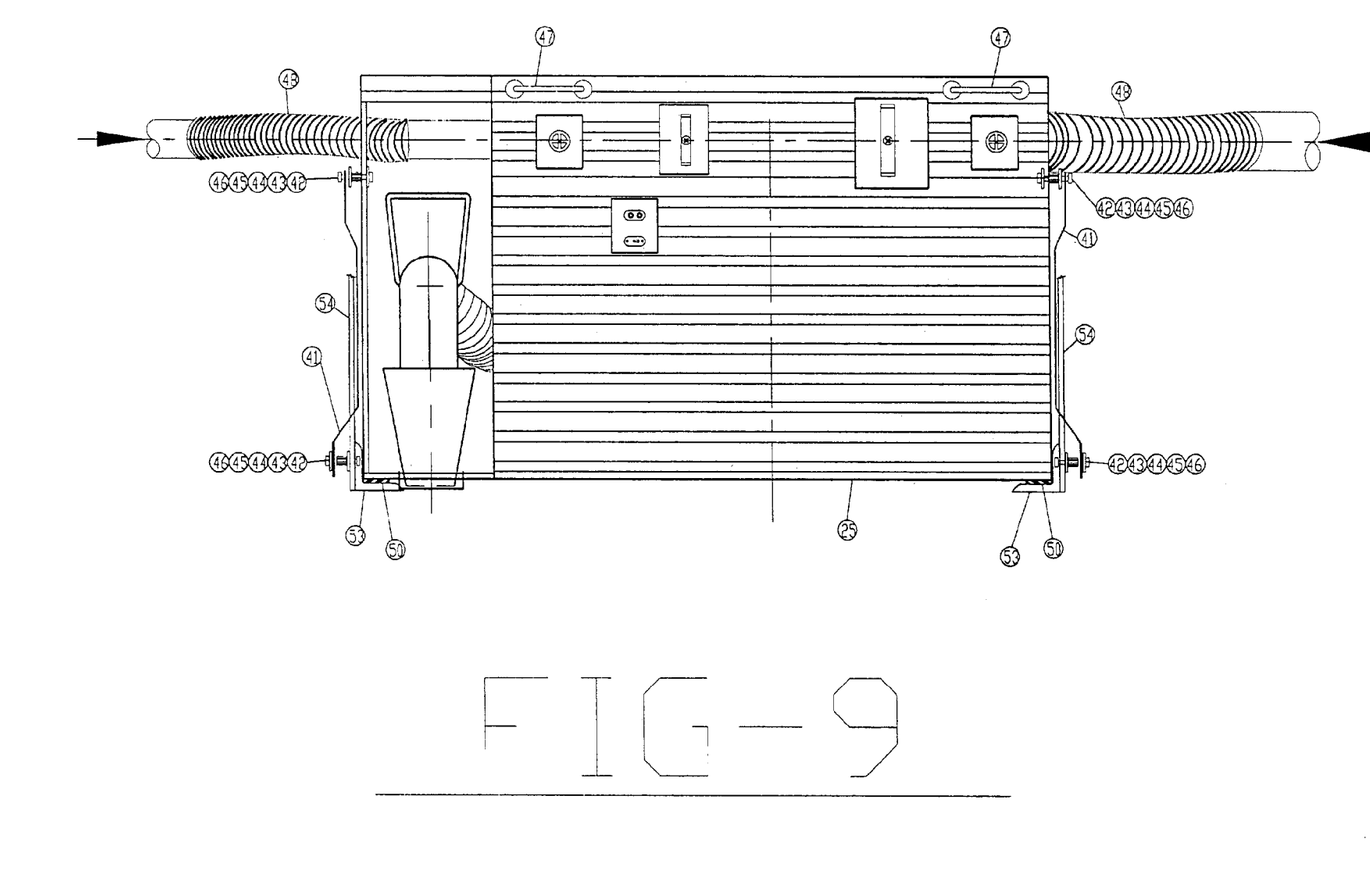
FIG. 9 is a front elevation view of a retrofit unit in accordance with the present invention.
Figure 10:
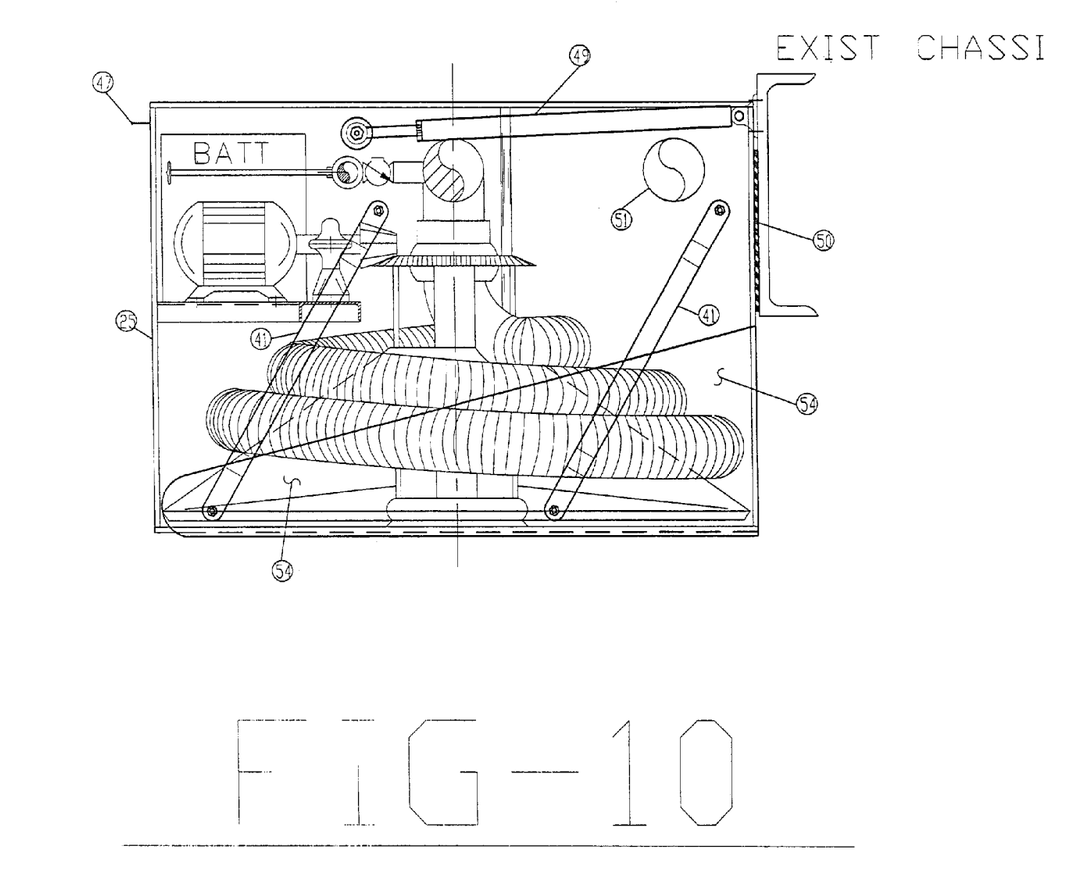
FIG. 10 is a right side elevation view of a retrofit unit in accordance with the present invention.
Figure 11:
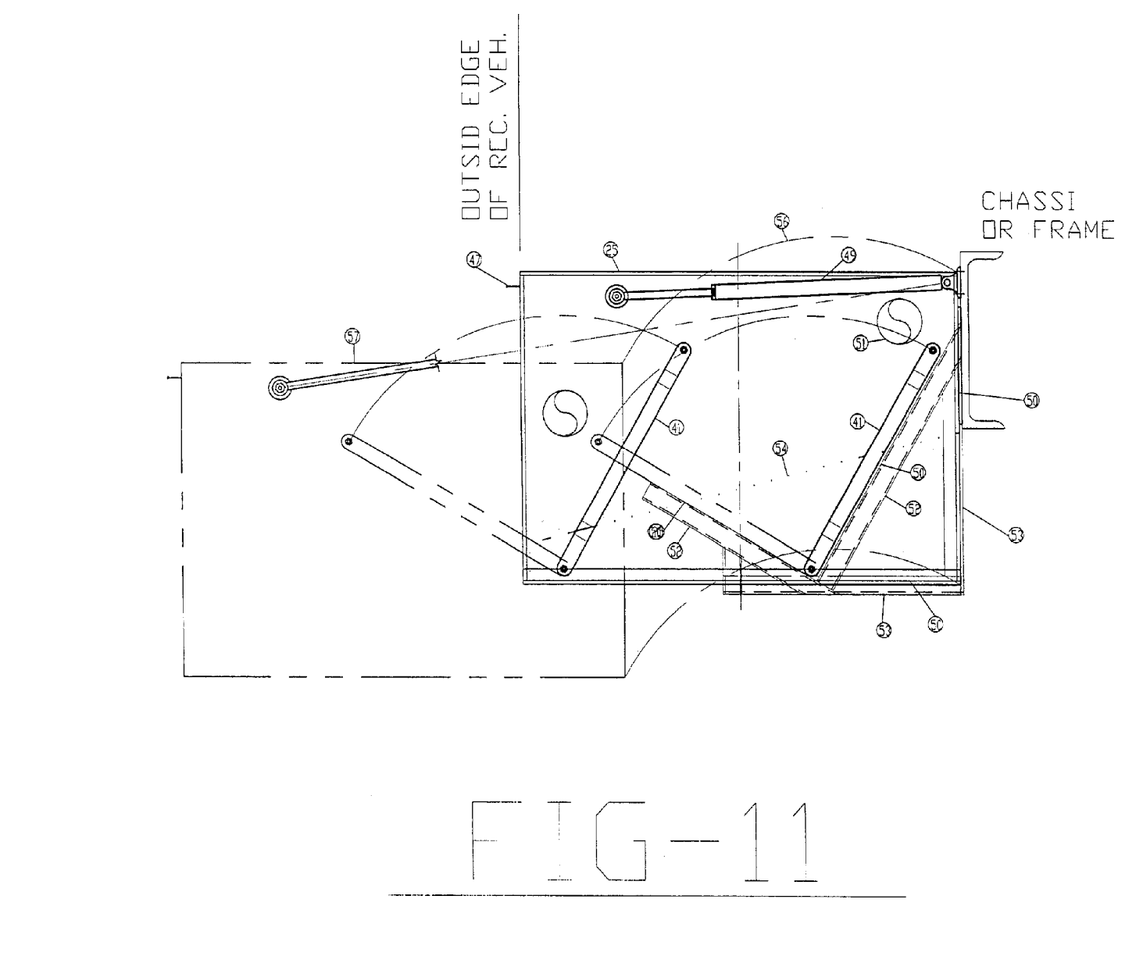
FIG. 11 is a side view showing the retrofit unit in both its retracted and extended position.
Figure 12:
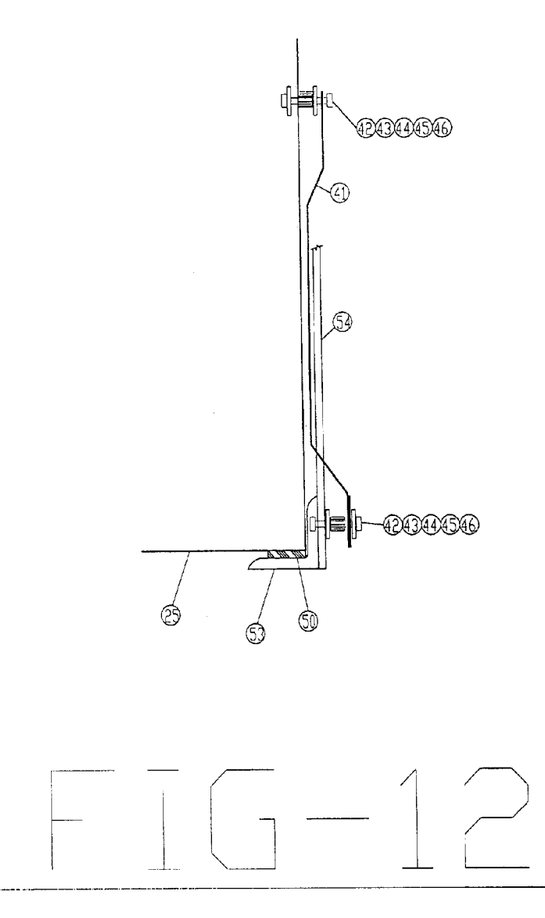
FIG. 12 is a close up of the hinge pivotal device, shown in FIG. 11.

FIGS. 8 through 12 show aspects of the retrofit unit in accordance with the present invention. FIG. 8 shows an RV in a parked position with an installed retrofit unit 57. The retrofit unit 57 is shown in the extended position where its hose 3 and dumping connector 6 connect to an underground dumping station (not shown). The retrofit unit 57 in accordance with the present invention may include all of the structural features of the previously described waste water disposal system and additionally includes a cradle that is connected to the chassis of the RV, as shown in FIGS. 10 and 11 and as described in further detail below.

FIG. 9 shows the flexible inlets and the pull out hinges along each side of the encasement as well as the placement of the handles at the top of the retrofit unit in accordance with the present invention. In particular, FIG. 9 shows flexible hose 48 connecting to retrofit unit 57 allowing for its movement forward and return. When in the forward position the hose 48 is still located within the outer shell of the RV. Retrofit unit 57 also may include handles 47 attached to provide a solid hand hold to pull the retrofit unit 57 forward with little effort. As the retrofit unit 57 glides effortlessly forward supported by hinges 41, shown in FIGS. 9, 11, and 12, the retrofit unit 57 rises only a few inches to extend. However, when retracting the retrofit unit into its place for traveling it must rise and therefore is assisted by a gas cylinder retracting pistons 49 that are connected to the chassis of the RV and to the side of encasement 25, as shown in FIGS. 10 and 11.

FIG. 10 is a right side elevation view of the retrofit unit in accordance with the present invention and shows how the retrofit unit is attached to the existing chassis of the RV. FIG. 10 also shows the relocation of the entrance location of the incoming water hoses.

The retrofit unit 57 nestles into a cushioned cradle made up of angle structure 53 overlaid inside by a rubber cushion 50, which supports the bottom of the unit, at its back or interior side. It is cushioned by rubber 50 permanently attached to the existing chassis frame. To aid in the support of retrofit unit 57, a rectangular structure is added and the outward area is overlaid with rubber 50 cushion to support the length of the back hinge 41, as shown in FIG. 11. When in the extended position, the same seating arrangement is present, as also shown in FIG. 11.

The tops of the hinges 41 are attached to the incased unit 25. The lower part of the hinges 41 are connected to a plate 54. The inboard hinge on the lower connection has no bends and is attached form the inside of the plate 54. Both hinge arms are of equal lengths at center to center.

This unit is lowered for express use of older RVs which have holding tanks installed at the lowest possible position. The retrofit unit of the present invention will accommodate all different types of RV's and is intended to be used regardless of where the holding tank is located.

The figures and accompanying discussion, illustrate and describe presently preferred embodiments and methods of the present invention. Those skilled in the art will understand that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention involve all embodiments falling within the scope of the appended claims.

What is claimed is:

1. A waste water disposal system for a recreational vehicle having at least one waste water tank, the system comprising:
   a waste water hose that is coupled to the gray and black water tanks wherein the waste water hose can be connected to an external sewer receptacle;
   a storage means for storing the hose, wherein the hose is coupled to the storage means and wherein the storage means rotates in a first direction to unwind the hose in a direction having a component along the first direction to deploy the hose to permit connection to the external sewer receptacle wherein the storage means rotates in a second direction to wind the hose in a direction having a component along the second direction to retract the hose into the recreational vehicle;
   a valve system that couples the hose to the waste tank of the recreational vehicle;
   control means for controlling the operation of the waste water disposal system.

2. The system of claim 1, wherein the storage means comprises a rotatable carousel mounted within the recreational vehicle.

3. The system of claim 2, wherein the rotatable carousel defines a conical shaped outer surface that receives the hose.

4. The system of claim 3, wherein the storage means comprises a motor that rotates the carousel in the first and second directions.

5. The system of claim 1, wherein valve system further couples the waste water hose to a flush water source such that the user can flush the waste water house without disconnecting the hose from the valve system.

6. The system of claim 1, further comprising an encasement that encloses the storage means.

7. The system of claim 6, wherein the encasement is adapted to be retrofitted to an existing waste water disposal system of a recreational vehicle.

8. The system of claim 7, wherein the encasement is movable between a retracted and extended position with respect to the recreational vehicle.

* * * * *